United States Patent
Hwang et al.

(10) Patent No.: US 10,946,664 B2
(45) Date of Patent: Mar. 16, 2021

(54) SUPPLY RESERVOIR

(71) Applicant: Hewlett-Packard Development Company, L.P., Spring, TX (US)

(72) Inventors: Peter G Hwang, Vancouver, WA (US); Matthew B Clark, Vancouver, WA (US); Christopher M Rives, Vancouver, WA (US); Delvin T Edmond, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/495,705

(22) PCT Filed: Mar. 24, 2017

(86) PCT No.: PCT/US2017/023957
§ 371 (c)(1),
(2) Date: Sep. 19, 2019

(87) PCT Pub. No.: WO2018/174893
PCT Pub. Date: Sep. 27, 2018

(65) Prior Publication Data
US 2020/0094571 A1    Mar. 26, 2020

(51) Int. Cl.
*B41J 2/175* (2006.01)
(52) U.S. Cl.
CPC ................ *B41J 2/17566* (2013.01)

(58) Field of Classification Search
CPC .......... B41J 2/17566; B41J 2002/17569; B41J 2/175; B41J 29/38; G03G 15/086; G03G 15/556; G03G 15/0863; G03G 15/553; G03G 15/5016
See application file for complete search history.

(56) References Cited

U.S. PATENT DOCUMENTS

| | | | |
|---|---|---|---|
| 4,432,005 A | 2/1984 | Duffield et al. | |
| 5,802,420 A | 9/1998 | Garr et al. | |
| 6,275,664 B1 * | 8/2001 | Wolf | B41J 2/17566 399/23 |
| 6,557,988 B1 | 5/2003 | Hartman | |
| 6,761,427 B1 * | 7/2004 | Owen | B41J 2/17566 347/19 |
| 6,863,364 B2 * | 3/2005 | Russell | B41J 2/17546 347/19 |
| 7,290,849 B2 | 11/2007 | Yamazaki et al. | |
| 8,186,785 B1 | 5/2012 | Gold et al. | |

(Continued)

OTHER PUBLICATIONS

How Much Ink is Left in That Dead Cartridge?., Dec. 2, 2008, <https://www.entrepreneur.com/article/~18 pages.

*Primary Examiner* — Jannelle M Lebron
(74) *Attorney, Agent, or Firm* — HP Inc. Patent Department

(57) ABSTRACT

Examples disclosed herein relate to displaying, on a user interface, an approximate amount of a supply material in a supply reservoir. Upon receiving, in a receptacle, a new supply container, the supply reservoir may be filled with supply material from the new supply container. The user interface may further display an updated approximate amount of the supply material in a supply reservoir and an approximate amount of the supply material in the supply container.

15 Claims, 4 Drawing Sheets

(56) References Cited

U.S. PATENT DOCUMENTS

2012/0230709 A1* 9/2012 Sakaguchi ......... G03G 15/0856
399/27
2014/0105619 A1* 4/2014 Elliott ................ G03G 15/0863
399/24

* cited by examiner

SUPPLY RESERVOIR

BACKGROUND

Inkjet printing devices include print heads having a number of nozzles. The nozzles are used to eject fluid (e.g., ink) onto a substrate to form an image. The nozzles are generally arranged in one or more columns or arrays such that a properly sequenced ejection of fluid from nozzles causes characters, symbols, and/or other graphics or images to be printed on the substrate as the print head and the substrate are moved relative to each other.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
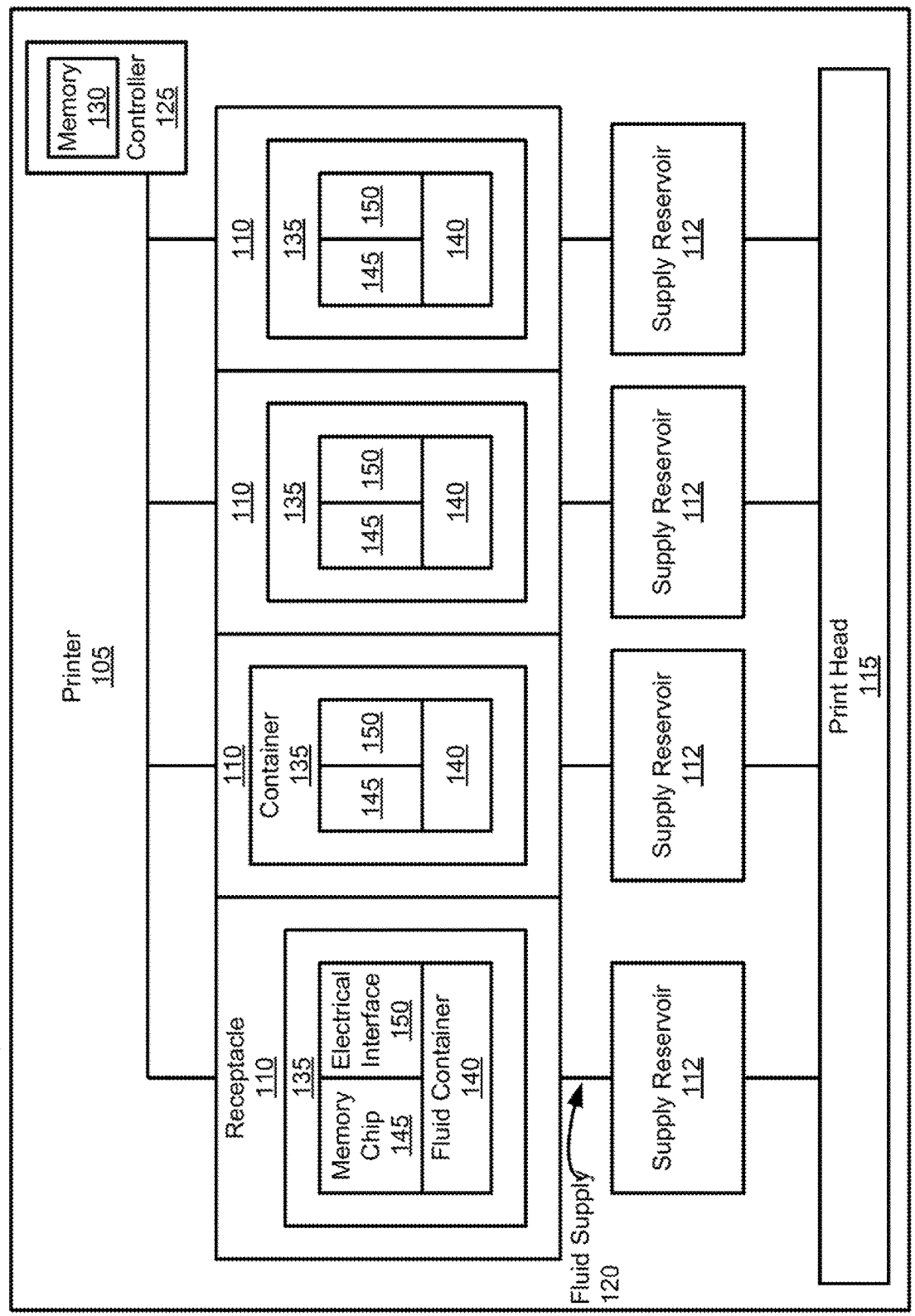
FIG. 1 illustrates a schematic view of an example apparatus comprising a supply reservoir.

A supply container may comprise supplies used to output printing jobs onto a medium. Such supplies may comprise, for example, ink, toner, and/or 3-D printer material. In some examples, the supply container interfaces with a print head through a container receptacle of a printer to facilitate printing, Each supply container may store one color of ink and/or a plurality of supply containers may each store different colors of ink. In other examples, such as when used in 3D printing, the supply container may store a fusing agent or detailing agent (e.g., water). The supply container may be removed, replaced, and/or refilled In the example of a liquid ink printer, electrical contacts carry electrical signals to and from a controller, for example, to control fluid drop generators in the print heads to eject fluid drops through nozzles onto a medium and to make fluid level measurements.

The supply containers may provide supplies to the print head by way of a supply reservoir. The supply reservoir may be maintained at a configurable level (e.g., 90-100% of capacity) so long as supply remains available from the container. Once the container is depleted, printing may continue for some time utilizing the supply remaining in the reservoir, giving time for the container to be replaced. Once a container is replaced, the reservoir may be refilled to the configured operational level. This may allow for a period of uninterrupted printing even when the supply container is empty.

Further, the level of supply in the container and the reservoir may be communicated to the user via a user interface. This may inform the user not only that an empty container is in need of replacing, but also of how much supply and/or how many printable pages are available due to the reservoir.

In some example implementations of the present subject matter, the supply container and/or reservoir includes an electrical interface (e.g., a printer application specific integrated circuit (ASIC)) to determine the level of supply such as by using a shift register integrated on a sensing die/substrate. In some examples, the shift register may comprise a series of sensing flops (e.g., flip-flops) coupled to electrodes embedded in the sensing die/substrate. The values stored by the sensing flops vary based on the contents of the supply container and/or reservoir. The contents of the supply container/reservoir may be all ink (e.g., a filled ink container), ink and air (e.g., a partially-filled ink container), just air (e.g., an empty ink container), toner, or an agent (e.g., a 3D printing agent). The circuitry on the shift register facilitates as many sensing flops as supply levels to be detected. For example, the shift register may include 100 sensing flops to provide supply level measurements in one percent increments, include 20 sensing flops to provide supply level measurements in five percent increments, etc. In some implementations usage statistics may be used to estimate how much supply is used per print job and/or per printed page, allowing the percentage of supply to be translated into a remaining number of jobs and/or pages.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 is a block diagram of an example printing system 100 that can be used to implement the teachings of this disclosure. The example printing system 100 of FIG. 1 includes an example printer 105, example receptacles 110, example supply containers 135, and example supply reservoirs 112. In an example implementation, the printer 105 is an inkjet printer (e.g., a thermal inkjet printer, a piezo inkjet printer, a continuous inkjet printer, etc.). In some examples, the printer 105 is a laser printer or 3D printer used to "print" three-dimensional objects.

The example printer 105 of FIG. 1 includes receptacle(s) 110 to receive and exchange corresponding supply container(s) 135. The receptacle(s) 110 are arranged to establish an interface between the supply containers 135, the supply reservoir(s) 112, and print head 115 via a coupling 120. In some implementations, the print head 115 is a page-wide array print head. However, other types of print heads, such as a scanning print head, may additionally or alternately be used. During a print operation, a substrate (e.g., paper) may extends under the print head 115. In some examples, the printer 105 may move receptacle(s) 110 over the substrate.

In an example implementation, the printer 105 is provided with a controller 125 including a memory 130. The controller 125 may retrieve and execute executable code from the memory 130. For example, the controller 125 may execute executable code to cause a power supply unit to provide power to the example print head 115. The memory 130 may include a variety of information such as an identifier of the printer 105, an identifier of supply containers 135 that may be used with the printer 105, calibration data, error information, etc.

The example supply containers 135 of FIG. 1 may comprise a fluid container 140, a memory chip 145 and an electrical interface 150. The receptacle(s) 110 are arranged to connect the fluid containers 140 to the supply reservoir(s) 112 through the fluid supply 120. In an example implementation, each supply container 135 may include a different fluid in the respective fluid containers 140. For example, if the printer 105 is an inkjet printer, the fluid in each fluid container 140 may include ink of a specific color (e.g., a cyan color, a magenta color, a yellow color, a black color and/or gray color, etc.). In another example, if the printer 105 is a 3D printer, the fluid in each, fluid container 140 may be an agent such as a fusing agent or a detailing agent (e.g., water). The supply containers 135 of FIG. 1 are arranged to be exchanged with respect to the corresponding receptacle 110.

The memory chip 145 of the supply containers 135 may include a variety of information such as an identifier of the type of supply container, an identification of the kind of fluid contained in the fluid container 140, calibration data, error information and/or other data. In some examples, the memory chip 145 includes information indicating when the respective supply container 135 should receive maintenance. In some examples, the printer 105 can take appropriate action based on the information contained in the memory chip 145, such as altering printing routines to maintain image quality.

In an example implementation, the controller 125 may retrieve data from the electrical interface 150, For example, the controller 125 may request the electrical interface 150 provide cartridge characteristics such as product characteristics, fluid quantity characteristics, fluid type characteristics, fluid supply level, etc. Supply reservoir(s) 112 may also be associated with similarly functioning memory chips and electrical interfaces (not shown) connected to controller 125 that may provide information such as an amount of supply stored in each supply reservoir 112.

Figure 2:
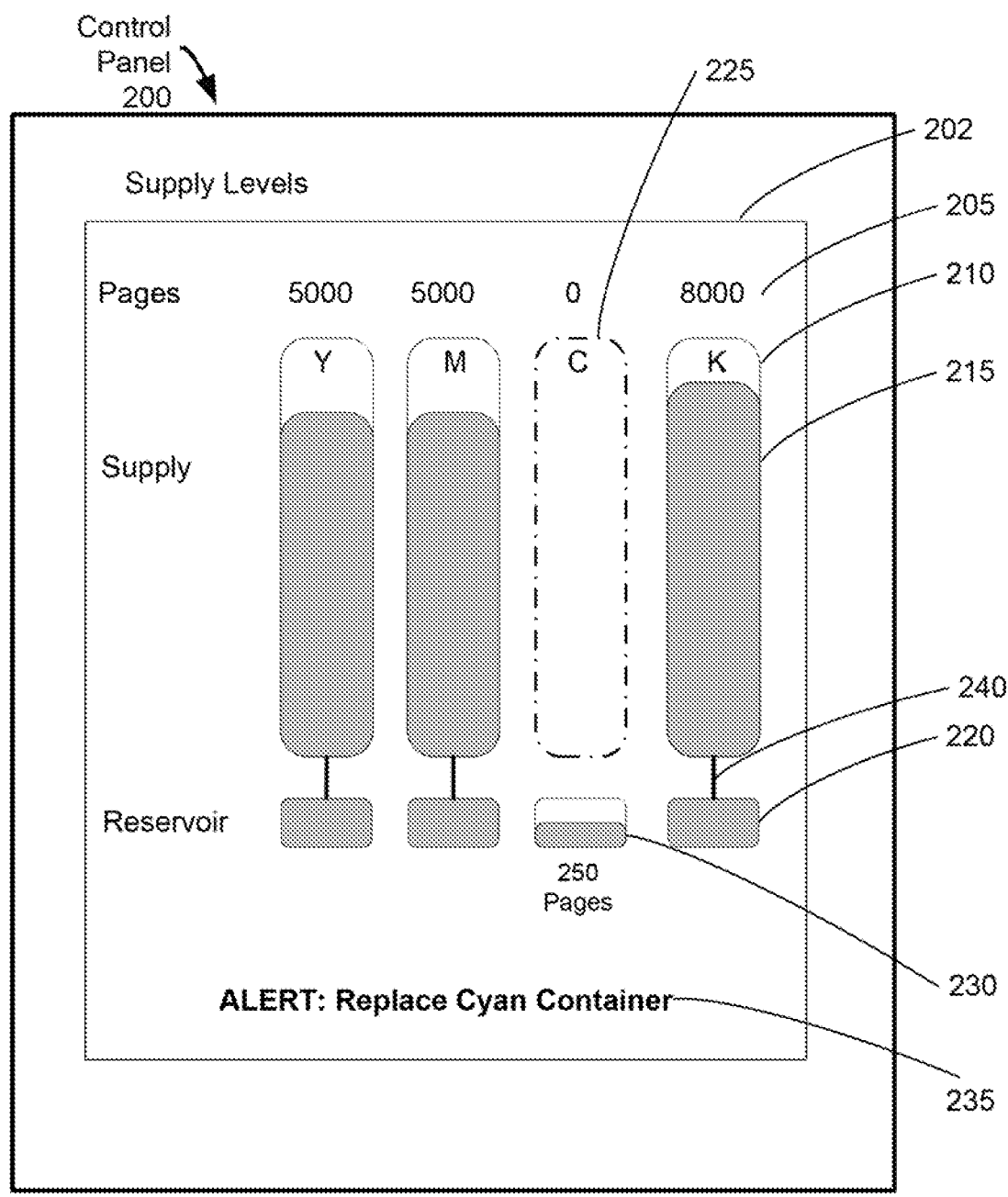
FIG. 2 is a block diagram of an example control, panel displaying an example user interface.

FIG. 2 is a block diagram of an example control panel 200 displaying an example user interface 202. Control panel 200 may be coupled to printer 105 and may receive instructions and information from controller 125 to drive user interface 202. User interface 202 may, for example, display a number of pages 205 available to be printed, a color designation 210, and an indicator of an amount of supply material in the supply container 215 for each supply container 135. Color designations may, for example, use "Y" for yellow, "M" for magenta. "C" for Cyan, and "K" for black colored supplies. Other types of supplies, such as 3-D agents, may use different color designations 210. User interface 202 may further display an approximate supply level for each supply reservoir 112 and a number of reserve pages available to print 230. In some implementations, the number of reserve pages 230 may be displayed upon a determination that the supply container 135. For example, if supply container 135 is empty of supply material, the supply reservoir 112 will begin being depleted and not refilled from its respective supply container 135. An empty supply container 135 may be indicated by a varied illustration 225 of the supply level. For example, the varied illustration may be flashing, may comprise dotted and/or dashed lines, and/or may have a different color. In some implementations, an alert message 235 may be displayed, such as a notification to replace an empty supply container 135 upon the determination that the supply container is empty of supply material. In some implementations each receptacle 110 may be configured to receive a plurality of supply containers 135, such as where multiple containers of the same supply material (e.g., all comprising black liquid ink) are coupled via a single receptacle 110 to a single supply reservoir 112.

In some implementations, user interface 202 may, upon determining that a new supply container has been inserted into the receptacle, display an indication of supply material flowing between the indicator of the amount of supply material in the supply container 215 and the indicator of the amount of supply material in the supply reservoir 220. For example, a connection indicator 240 between container indicator 215 and reservoir indicator 220 may flash, change color, and/or display an animation of material (e.g., drops) flowing between supply indicator 215 and reservoir indicator 220. In some implementations, connection indicator 240 may not be displayed when the respective supply container is empty and printing is being accomplished from the supply reservoir, as illustrated in user interface 202 for empty container indicator 225.

Although the example description above is made with reference to a colored liquid inks, the supplies may comprise different materials such as toner powder and 3-D agents. The descriptions of FIGS. 1 and 2 above are depicted ire an arrangement for, four supply containers 135, but this is merely an example. Similar arrangements may be used to support a single supply container and/or any number of multiple supply containers.

Figure 3:
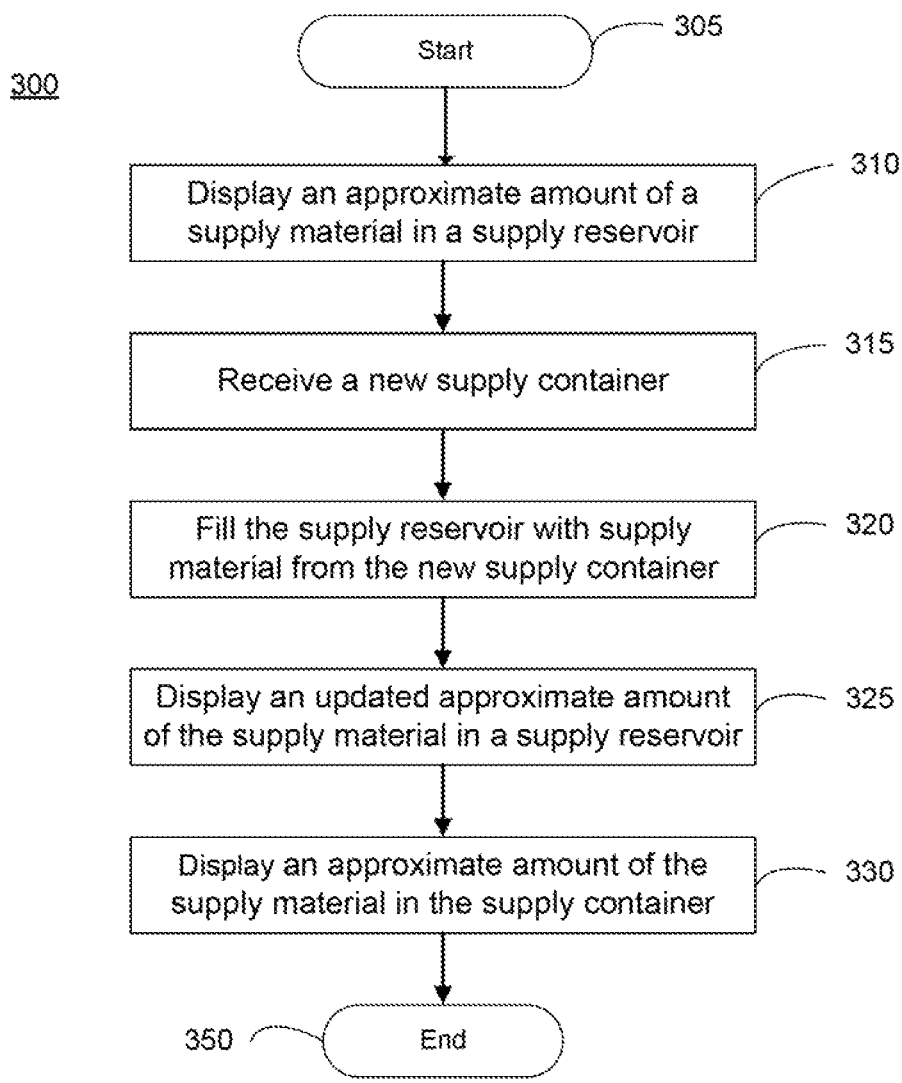
FIG. 3 is an example flowchart representative of a method for providing a supply reservoir user interface.

FIG. 3 is an example flowchart representative of a method 300 for providing a supply reservoir user interface 202. Although execution of method 300 is described below with reference to printer 105, other suitable components for execution of method 300 may be used.

Method 300 may begin in stage 305 and proceed to stage 310 where printer 105 may display, on a user interface 202, an approximate amount of a supply material in a supply reservoir 230. In some implementations, the approximate amount of the supply material in the supply reservoir may comprise a display of a count of pages able to be printed with the approximate amount of the supply material in the supply reservoir, such as number of reserve pages 230 on user interface 202. In some implementations, the approximate amount of the supply material in the supply reservoir may comprise a graphic indicating an approximate percentage of the total capacity of the supply reservoir containing supply material. For example, the graphic may comprise a filled portion of a larger container graphic, wherein the filled portion fills an amount of the larger container graphic approximately equal to the approximate percentage of the total capacity of the supply reservoir containing supply material. In user interface 202, the approximate amount of the supply material in the supply reservoir may be interpreted as 50% of the total capacity of the supply reservoir.

Method 300 may then advance to stage 316 where printer 105 may receive, in a receptacle, a new supply container. For example, a replacement supply container 135 for an empty supply container may be inserted into receptacle 110 of printer 105. The replacement supply container generally comprises the same type of supply material as the empty supply container. For example, an empty cyan ink supply container will be replaced with a new and/or refilled cyan ink supply container.

Method 300 may then advance to stage 320 where printer 105 may the supply reservoir with supply material from the new supply container. For example, fluid supply 120 may pass supply material from the new supply container 135 to the supply reservoir 112 to a configured level of the supply reservoir. The configured level may typically comprise 100% of the supply reservoir's available capacity, but may be configured to other levels.

Method 300 may then advance to stage 325 where printer 105 may display an updated approximate amount of the supply material in a supply reservoir. For example, user interface 202 may, upon determining that a new supply container has been inserted into the receptacle, display an indication of supply material flowing between the indicator of the amount of supply material in the supply container 215 and the indicator of the amount of supply material in the supply reservoir 220. For example, a connection indicator 240 between container indicator 215 and reservoir indicator 220 may flash, change color, and/or display an animation of material (e.g., drops) flowing between supply indicator 215 and reservoir indicator 220.

Method 300 may then advance to stage 330 where printer 105 may display an approximate amount of the supply material in the supply container 135. For example, the indicator of the amount of supply material in the supply container 215 may be adjusted to reflect the amount of supply material removed to refill the supply reservoir 112.

Method 300 may then end at stage 350.

Figure 4:
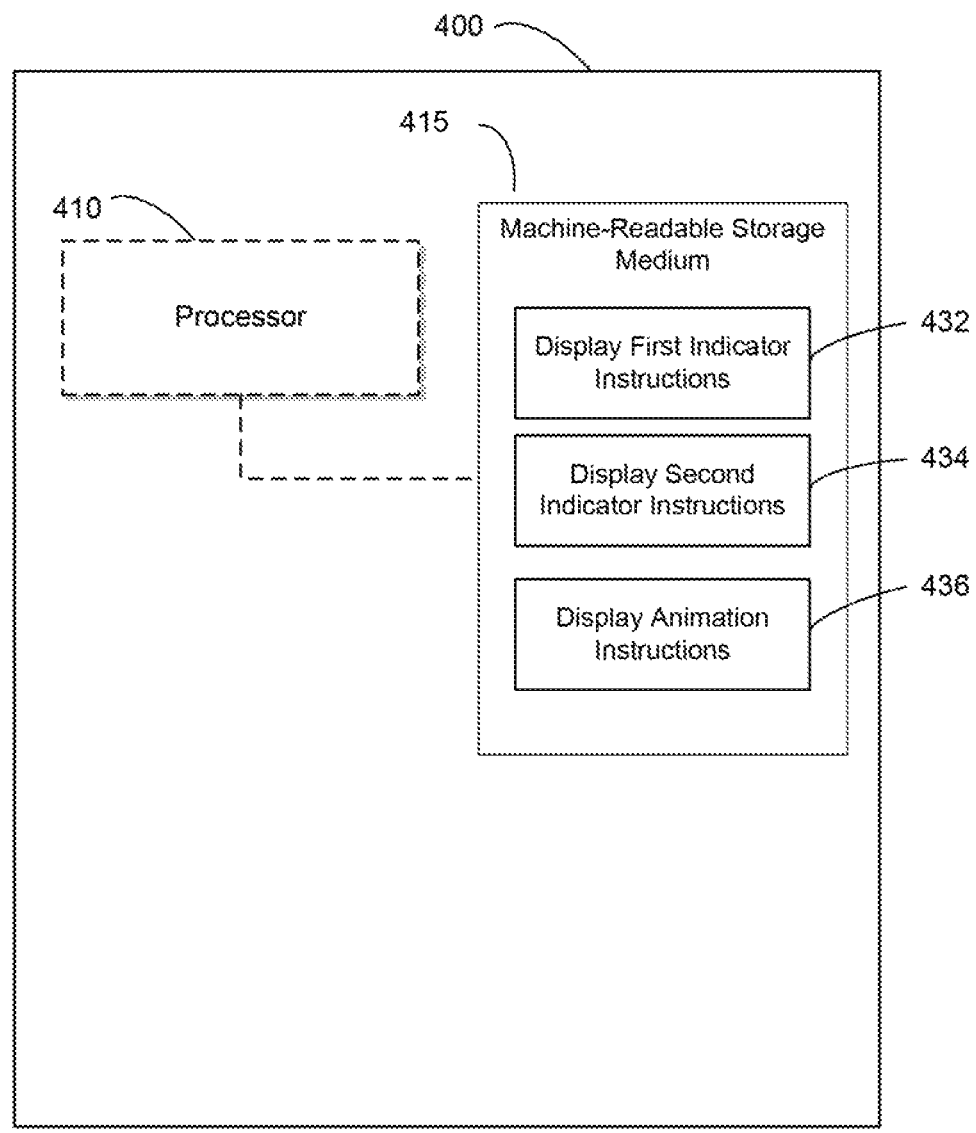
FIG. 4 is a block diagram of an example computing device 400 for providing a supply reservoir user interface.

FIG. 4 is a block diagram of an example computing device 400 for providing a supply reservoir user interface. Computing device 400 may comprise a processor 410 and a memory 415 comprising a non-transitory, machine-readable storage medium. Memory 415 may comprise a plurality of processor-executable instructions, such as display first indicator instructions 432, display second indicator instructions 434 and display animation instructions 436. In some implementations, instructions 432, 434, 436, may be associated with a single computing device 400 and/or may be communicatively coupled among different computing devices such as via a direct connection, bus, or network.

Processor 410 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 415. In particular, processor 410 may fetch, decode, and execute instructions 432, 434, 436.

Executable instructions 432, 434, 436 may comprise logic stored in any portion and/or component of machine-readable storage medium 415 and executable by processor 410. The machine-readable storage medium 415 may comprise both volatile and/or nonvolatile memory and data storage components. Volatile components are those that do not retain data values upon loss of power. Nonvolatile components are those that retain data upon a loss of power.

The machine-readable storage medium 415 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Display first indicator instructions 432 may display, on a user interface, a first indicator indicating an amount of a supply material in a supply container. For example, display first indicator instructions 432 may cause user interface 202 to display the indicator of an amount of supply material in the supply container 215 for each supply container 135, User interface 202 may be displayed, for example, on a control panel 200 of printer 105 and/or another display such as may be rendered on a computer or via a web page.

Display second indicator instructions 434 may display, on the user interface, a second indicator indicating an amount of a supply material in a supply reservoir. For example, display second indicator instructions 434 may cause user interface 202 to display the indicator of the amount of supply material in the supply reservoir 230 for each supply reservoir 112.

Upon detection of a new supply container, display first indicator instructions 432 and display second indicator instructions 434 may display updates to the first and second indicators, respectively. For example, controller 125 may detect the insertion of a new supply container 135 into receptacle 110 via connection with electrical interface 150. Measurements of the amount of supply material in fluid container 140 may be provided to controller 125, which may in turn be used to provide the value for the first indicator. Similarly, measurements of the amount of supply material in supply reservoir 112 be used to provide the value for the second indicator.

Display animation instructions 436 may display, on the user interface, an animation of the supply material flowing to the first indicator from the second indicator. For example, display animation instructions 436 may cause user interface 202 to display an indication of supply material flowing between the indicator of the amount of supply material in the supply container 215 and the indicator of the amount of supply material in the supply reservoir 220. For example, a connection indicator 240 between container indicator 215 and reservoir indicator 220 may flash, change color, and/or display an animation of material (e.g., drops) flowing between supply indicator 215 and reservoir indicator 220.

Although one computing device 400 is depicted in FIG. 4, certain implementations may comprise more than one computing device 400. At least one of the computing devices may be employed and arranged, for example, in at least one server bank, computer bank, data center, and/or other arrangements. For example, the computing devices together may include a cloud computing resource, a grid computing resource, and/or any other distributed computing arrangement. Such computing devices may be located in a single installation and/or may be distributed among many different geographical locations.

The disclosed examples may include systems, devices, computer-readable storage media, and methods for document element re-positioning. For purposes of explanation, certain examples are described with reference to the components illustrated in the Figures. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by these terms. Instead, these terms are only used to distinguish one element from another.

Further, the sequence of operations described in connection with the Figures are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

What is claimed is:

1. An apparatus, comprising:
a receptacle configured to receive a supply container;
a supply reservoir coupled to the receptacle;
a control panel to display a user interface, wherein the user interface displays:
an indicator of an amount of supply material in the supply container,
an indicator of an amount of supply material in the supply reservoir, and
upon a determination that the supply container is empty of supply material:
an alert to replace the supply container; and
an estimated number of additional pages available to be printed according to an amount of supply material in the supply reservoir before the supply container is replaced; and
print hardware to print the additional pages using the supply material in the supply reservoir prior to replacement of the supply container.

2. The apparatus of claim 1, wherein the supply material comprises toner powder.

3. The apparatus of claim 1, wherein the supply material comprises liquid ink.

4. The apparatus of claim 1, wherein the receptacle is configured to receive a plurality of supply containers.

5. The apparatus of claim 4, wherein each of the plurality of supply containers is associated with a different color.

6. The apparatus of claim 5, wherein the user interface displays a separate indicator of the amount of supply material in each of the plurality of supply containers.

7. The apparatus of claim 4, wherein each of the plurality of supply containers is associated with one of a plurality of supply reservoirs.

8. The apparatus of claim 5, wherein the user interface displays a separate indicator of the amount of supply material in each of the plurality of supply reservoirs.

9. The apparatus of claim 1, wherein, upon determining that a new supply container has been inserted into the receptacle, the user interface displays an animation of supply material flowing between the indicator of the amount of supply material in the supply container and the indicator of the amount of supply material in the supply reservoir.

10. The apparatus of claim 1, wherein the supply reservoir is refilled from the supply container upon a determination that a new supply container has been inserted into the receptacle.

11. A method comprising:
upon a determination that a supply container is empty of supply material, displaying, on a user interface, an approximate amount of a supply material in a supply reservoir that is available for printing additional pages before the supply container is replaced;
printing the additional pages using the supply material in the supply reservoir prior to replacement of the supply container;
receiving, in a receptacle, a new supply container in replacement of the supply container that is empty;
filling the supply reservoir with supply material from the new supply container; and
displaying on the user interface:
an updated approximate amount of the supply material in a supply reservoir, and
an approximate amount of the supply material in the supply container.

12. The method of claim 11, wherein the approximate amount of the supply material in the supply reservoir is displayed as a count of pages able to be printed with the approximate amount of the supply material in the supply reservoir.

13. The method of claim 11, wherein the user interface displays the approximate amount of the supply material in each of a plurality of supply reservoirs.

14. The method of claim 13, wherein a different supply material is associated with each of the plurality of supply reservoirs.

15. A non-transitory machine readable medium storing instructions executable by a processor to:
upon a determination that a supply container is empty of supply material, display, on a user interface, a first indicator indicating an amount of a supply material in a supply reservoir that is available for printing additional pages before the supply container is replaced;
print the additional pages using the supply material in the supply reservoir prior to replacement of the supply container;
receive, in a receptacle, a new supply container;
fill the supply reservoir with supply material from the new supply container; and
display, on the user interface:
an updated first indicator indicating a new approximate amount of the supply material in the supply reservoir,
a second indicator indicating an approximate amount of the supply material in the new supply container, and
an animation of the supply material flowing to the first indicator from the second indicator.

* * * * *